United States Patent
Sandberg et al.

(10) Patent No.: US 10,251,080 B2
(45) Date of Patent: Apr. 2, 2019

(54) NETWORK NODE AND A METHOD THEREIN FOR ESTIMATING A CONVERGENCE TIME OF INTERFERENCE PROCESSING IN A USER EQUIPMENT IN A RADIO COMMUNICATIONS NETWORK

(71) Applicant: Telefonaktiebolaget LM Ericsson (publ), Stockholm (SE)

(72) Inventors: Sara Sandberg, Luleå (SE); Svante Bergman, Hägersten (SE); Per Burström, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 178 days.

(21) Appl. No.: 15/300,826

(22) PCT Filed: Apr. 3, 2014

(86) PCT No.: PCT/SE2014/050400
§ 371 (c)(1),
(2) Date: Sep. 30, 2016

(87) PCT Pub. No.: WO2015/152777
PCT Pub. Date: Oct. 8, 2015

(65) Prior Publication Data
US 2017/0026866 A1    Jan. 26, 2017

(51) Int. Cl.
*H04W 24/10* (2009.01)
*H04B 7/06* (2006.01)
*H04W 24/08* (2009.01)
*H04W 88/02* (2009.01)

(52) U.S. Cl.
CPC .......... *H04W 24/10* (2013.01); *H04B 7/0626* (2013.01); *H04B 7/0632* (2013.01); *H04W 24/08* (2013.01); *H04W 88/02* (2013.01)

(58) Field of Classification Search
CPC .... H04B 7/0626; H04B 7/0632; H04W 24/10
See application file for complete search history.

(56) References Cited

U.S. PATENT DOCUMENTS

2005/0085255 A1*    4/2005  Andersson ............ H04W 52/12
                                                                         455/522
2010/0056140 A1*    3/2010  Hafeez .................. H04B 7/024
                                                                         455/434

(Continued)

OTHER PUBLICATIONS

3GPP, "3rd Generation Partnership Project; Technical Specification Group Radio Access Network; Evolved Universal Terrestrial Radio Access (E-UTRA); Physical layer procedures (Release 11)", 3GPP TS 36.213 V11.6.0, Mar. 2014, 1-79.

*Primary Examiner* — Hassan Kizou
*Assistant Examiner* — Deepa Belur
(74) *Attorney, Agent, or Firm* — Patent Portfolio Builders, PLLC

(57) ABSTRACT

A method performed by a network node (110) for estimating a convergence time of interference processing in a user equipment, UE (121), served by the network node (110) in a radio communications network (100) is provided. The network node has at least one Channel State Information, CSI, process configured for the UE. The network node receives, from the UE, at least one first CSI report based on signals transmitted on interference measurement resources of a first CSI process of the UE, wherein the first CSI process is in a first interference state. The network node then switches the first CSI process from the first interference state to a second interference state. After the switch, the network node receives, from the UE, at least one second CSI report based on signals transmitted on the interference measurement resources of the first CSI process of the UE, wherein the first CSI process is in the second interference state. Then, the network node estimates the convergence time of the (Continued)

interference processing in the UE using the received at least one first CSI report and the received at least one second CSI report. A network node (110) for estimating a convergence time of interference processing in a user equipment, a computer program and carrier are also provided.

27 Claims, 6 Drawing Sheets

(56) References Cited

U.S. PATENT DOCUMENTS

| | | | | |
|---|---|---|---|---|
| 2012/0202477 A1* | 8/2012 | Eriksson | ............... | H04L 1/0021 455/419 |
| 2013/0170533 A1* | 7/2013 | Khojastepour | ...... | H04B 7/0456 375/227 |
| 2013/0237261 A1* | 9/2013 | Bazzi | ................ | H04L 25/03343 455/501 |
| 2013/0303090 A1* | 11/2013 | Hammarwall | ....... | H04B 7/0456 455/67.13 |
| 2013/0303217 A1* | 11/2013 | Tao | ........................ | H04B 7/024 455/501 |
| 2013/0322376 A1 | 12/2013 | Marinier et al. | | |
| 2014/0274096 A1* | 9/2014 | Stanwood | ............ | H04J 11/0056 455/452.1 |
| 2016/0080961 A1* | 3/2016 | Kim | ...................... | H04L 27/264 370/252 |
| 2016/0198480 A1* | 7/2016 | Stanwood | ............. | H04L 5/0073 370/329 |
| 2017/0012691 A1* | 1/2017 | Lee | ..................... | H04L 25/0226 |
| 2017/0244461 A1* | 8/2017 | Hammarwall | ........ | H04W 24/02 |

\* cited by examiner

NETWORK NODE AND A METHOD THEREIN FOR ESTIMATING A CONVERGENCE TIME OF INTERFERENCE PROCESSING IN A USER EQUIPMENT IN A RADIO COMMUNICATIONS NETWORK

TECHNICAL FIELD

Embodiments herein relate to estimating a convergence time of interference processing in a user equipment in a radio communications network. In particular, embodiments herein relate to a network node and a method therein for estimating a convergence time of interference processing in a user equipment in a radio communications network.

BACKGROUND

In a typical radio communications network, wireless terminals, also known as mobile stations, terminals and/or user equipments, UEs, communicate via a Radio Access Network, RAN, to one or more core networks. The radio access network covers a geographical area which is divided into cell areas, with each cell area being served by a base station, e.g. a radio base station, RBS, or network node, which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System, UMTS, is a third generation mobile communication system, which evolved from the second generation, 2G, Global System for Mobile Communications, GSM. The UMTS terrestrial radio access network, UTRAN, is essentially a RAN using wideband code division multiple access, WCDMA, and/or High Speed Packet Access, HSPA, for user equipments. In a forum known as the Third Generation Partnership Project, 3GPP, telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the 3$^{rd}$ Generation Partnership Project, 3GPP, and this work continues in the coming 3GPP releases. The EPS comprises the Evolved Universal Terrestrial Radio Access Network, E-UTRAN, also known as the Long Term Evolution, LTE, radio access, and the Evolved Packet Core, EPC, also known as System Architecture Evolution, SAE, core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network.

As such, the Radio Access Network, RAN, of an EPS has an essentially "flat" architecture comprising radio base station nodes without reporting to RNCs.

In LTE, as in any communication system, a UE may estimate the effective channel that a reference signal is traversing by measuring on the reference signal, e.g. a Channel State Information Resource Symbol, CSI-RS, defined for LTE. Here, the effective channel comprises the radio propagation channel, antenna gains, and any possible antenna virtualizations. For antenna virtualization, a CSI-RS port may be precoded so that it is virtualized over multiple physical antenna ports, that is, the CSI-RS port may be transmitted on multiple physical antenna ports, possibly with different gains and phases.

By further configuring radio resources which a UE is mandated to use for measuring interference plus noise, such as, for example, CSI-Interference Management, CSI-IM, resources defined for LTE, a UE may assume that there are a number of transmission points that are transmitting on this radio resource, and that the received signal power may therefore be used as a measurement of the interference plus noise from these transmission points. Thus, based on a specified reference signal measurement and on an interference measurement configuration, the UE may estimate the effective channel and interference plus noise, and consequently also determine which rank, pre-coder and transport format to recommend which best matches the particular channel.

The CSI resource feedback from the UE to the network node may be either explicit or implicit. LTE has currently adopted an implicit CSI mechanism in which a UE does not explicitly report, e.g. the complex valued elements of a measured effective channel, but rather that the UE recommends a transmission configuration suitable for the measured effective channel. The recommended transmission configuration thus implicitly gives the network node information about the underlying channel state.

In LTE, the CSI feedback is given in terms of a transmission Rank Indicator, RI, a Pre-coder Matrix Indicator, PMI, and Channel Quality Indicator(s), CQI. The CQI/RI/PMI report, i.e. the CSI report, may be wideband or frequency selective depending on which reporting mode that is configured. Typically, the UE performs filter processing of the measured reference signals as a means to improve receiver performance by the UE. This filter processing may be performed in time and frequency, and in some cases, such as for De-Modulation Reference Signals, DMRS, the UE is mandated to perform the filter processing according to standard specifications.

However, for CSI feedback reports, there is no mandated filter processing of the interference measurements performed on CSI-IM. Thus, the filter processing of the interference measurements performed on CSI-IM by the UE is a UE receiver design choice that is proprietary for each UE vendor. Typically, a UE performs time filter processing of the measured interference on CSI-IM, and use the time filtered value when calculating the CQI, RI and PMI to include in the CSI reports.

It may be noted that the RI corresponds to a recommended number of streams that are to be spatially multiplexed and thus transmitted in parallel over the effective channel, whereas the PMI identifies a recommended pre-coder, normally present in a codebook, for the transmission, which relates to the spatial characteristics of the effective channel.

The CQI represents a recommended Modulation and Coding Scheme, MCS. For example, a UE may normally report one of 16 different CQI values representing 16 different MCS. The UE reports the highest CQI value that has target block error rate less than 10%. Thus, since the current Signal-to-Interference-plus-Noise Ratio, SINR, of the spatial stream(s) over which the transmission occurs directly effects the target block error rate, there is thus a relationship between the CQI and the SINR of the spatial stream(s) over which the transmission occurs.

In uncoordinated systems, i.e. wherein each transmission point or cell independently performs transmissions to the UEs located within its range, the UE may effectively measure the interference observed from all other transmission points, or all other cells, using wideband interference information, such as, for example, Reference Signal Received Power (RSRP). This may then serve as the relevant interference level in an upcoming data transmission.

In coordinated systems, i.e. wherein multiple transmission points or cells may schedule and perform coordinated transmissions to the UEs located within their ranges, the network may to a large extent control the transmission points or cells that are interfering with transmissions to a UE. Hence, there will here be multiple interference hypotheses or scenarios which will depend on which transmissions points or cells that are transmitting data transmission to other UEs.

Additionally, the network may here also choose to transmit interference from specific transmission points or cells for the purpose of testing how that particular interference hypothesis or scenario affects transmission to a UE. In LTE Release 11, CSI processes are defined such that each CSI process is associated with a CSI-RS resource and a CSI-IM resource. A UE configured for Transmission Mode 10 in LTE Release 11 may be configured with one or more CSI processes per serving cell by higher layers, and a CSI report reported by the UE corresponds to a CSI process. Since multiple, e.g. up to three or perhaps even six, CSI processes may be reported by the UEs, the network may test different interference hypothesis or scenarios simultaneously for a UE. Then, based on their different effects which are reported back to the network node by the UE in the CSI reports, the network node may adapt its transmission scheme to the UE for future transmissions.

For large coordination clusters in challenging scenarios with many strong interferers, the network may require CSI information corresponding to many interference hypotheses or scenarios. Depending on the coordination scheme, the number of hypotheses or scenarios to test may be as many as $2^N$ for N number of interferers. A known way to assess multiple interference hypotheses or scenarios is to use time-multiplexing, i.e. change the hypotheses or scenarios in time and store the results. This, however, may be a time-consuming task and result in that the interference measurement may not be performed on a fast enough basis for coordinated transmissions.

SUMMARY

It is an object of embodiments herein to improve the efficiency of interference measurements in a radio communications network.

According to a first aspect of embodiments herein, the object is achieved by a method performed by a network node for estimating a convergence time of interference processing in a user equipment, UE, served by the network node in a radio communications network. The network node has at least one Channel State Information, CSI, process configured for the UE. The network node receives, from the UE, at least one first CSI report based on signals transmitted on interference measurement resources of a first CSI process of the UE, wherein the first CSI process is in a first interference state. The network node then switches the first CSI process from the first interference state to a second interference state. After the switch, the network node receives, from the UE, at least one second CSI report based on signals transmitted on the interference measurement resources of the first CSI process of the UE, wherein the first CSI process is in the second interference state. Then, the network node estimates the convergence time of the interference processing in the UE using the received at least one first CSI report and the received at least one second CSI report.

According to a second aspect of embodiments herein, the object is achieved by a network node for estimating a convergence time of interference processing in a UE served by the network node in a radio communications network. The network node has at least one CSI process configured for the UE. The network node is configured to receive, from the UE, at least one first CSI report based on signals transmitted on interference measurement resources of a first CSI process of the UE, wherein the first CSI process is in a first interference state. Further, the network node is configured to switch the first CSI process from the first interference state to a second interference state. After the switch, the network node is configured to receive, from the UE, at least one second CSI report based on signals transmitted on the interference measurement resources of the first CSI process of the UE, wherein the first CSI process is in the second interference state. Then, the network node is configured to estimate the convergence time of the interference processing in the UE using the received at least one first CSI report and the received at least one second CSI report.

According to a third aspect of embodiments herein, the object is achieved by a computer program, comprising instructions which, when executed on at least one processor, cause the at least one processor to carry out the method described above.

According to a fourth aspect of embodiments herein, the object is achieved by a carrier containing the computer program described above, wherein the carrier is one of an electronic signal, optical signal, radio signal, or computer readable storage medium.

By estimating the convergence time of the interference processing based on CSI reports before and after switching interference state of a CSI process, the network node is able to determine when the transmission configuration, i.e. CSI, reported by a UE is not affected by interference from previous measurements. This enables the network node to improve the efficiency of interference measurements in the radio communications network. This, in turn, allows interference measurements to be used for a faster and more accurate prediction of the behaviour of the UE in different coordinated transmission schemes. Consequently, this will improve the performance for such coordinated transmissions and result in an improvement of the spectral efficiency in the radio communications network.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
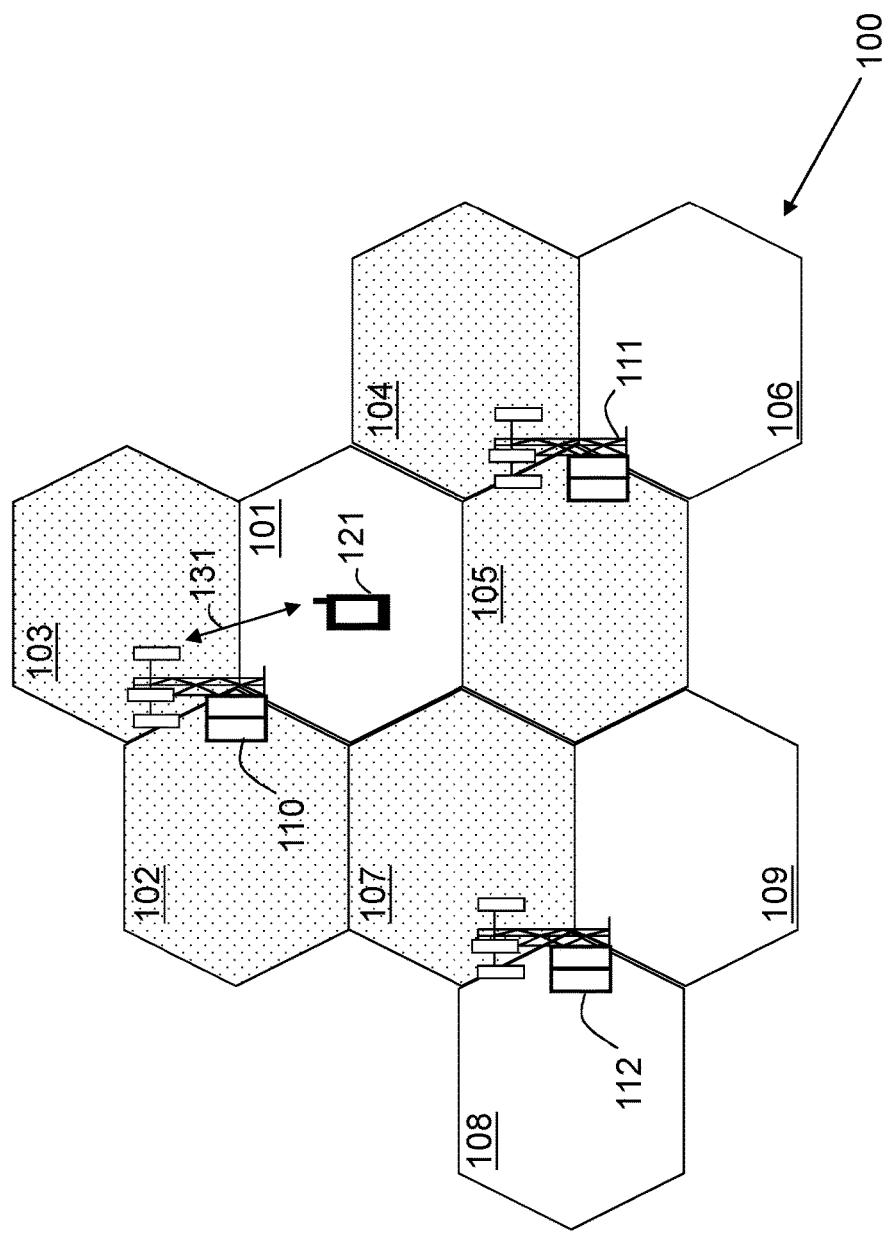
FIG. 1 is a schematic block diagram illustrating embodiments of network nodes in a radio communications network.

The figures are schematic and simplified for clarity, and they merely show details which are essential to the understanding of the embodiments presented herein, while other details have been left out. Throughout, the same reference numerals are used for identical or corresponding parts or steps.

FIG. 1 shows an example of a radio communications network 100 in which embodiments herein may be implemented. Although illustrated in FIG. 1 as an LTE network, the radio communications network 100 may be any wireless communication system, such as, LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM network, or other 3GPP cellular network or system. The radio communications system 100 comprises the network nodes 110-112.

Each of the network nodes 110-112 may e.g. be an eNB, eNodeB, or a Home Node B, a Home eNode B, femto Base Station (BS), pico BS or any other network unit capable to serve a user equipment or a machine type communication device in the radio communications system 100. The network nodes 110-112 may also be e.g. a base station controller, a network controller, a relay node, a repeater, an access point, a radio access point, a Remote Radio Unit (RRU) or a Remote Radio Head (RRH). Furthermore, the network nodes 110-112 each comprise one or more antennas for wireless radio communication with user equipments, UEs, located within their coverage range; that is, each of the network nodes 110-112 may use one or more of its antennas to provide radio coverage within its cells. The network nodes 110-112, or one or more of its antennas, may be referred to herein a transmission point.

A cell may be seen as a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcasted in the cell. Another identity identifying each cell uniquely in the whole radio communication network 100 may also be broadcasted in the cell. The network node 110 communicates over the air or radio interface operating on radio frequencies with the UEs within range of the network node 110.

A user equipment 121 is located within the cell 101. The UE 121 is configured to communicate within the radio communications network 100 via the network node 110 over a radio link 131 when present in the cell 101 served by the network node 110. The UE 121 may e.g. be any kind of wireless device such as a mobile phone, a cellular phone, a Personal Digital Assistant (PDA), a smart phone, a tablet, a sensor equipped with a UE, Laptop Mounted Equipment (LME) (e.g. USB), Laptop Embedded Equipment (LEE), Machine Type Communication (MTC) device, a UE with D2D capability, Customer Premises Equipment (CPE), etc. The UE 121 may also refer to a Machine-to-Machine, M2M, communication device that serves as a data communication modem or is built into equipment communicating data with a server without human interaction.

In the example shown in FIG. 1, the network nodes 110-112 are each configured to provide wireless radio coverage to UEs in each of its cells 101-103, 104-106, 107-109, respectively. The network nodes 110-112 may be connected and configured to communicate with each other, e.g. over an X2 connection. The network nodes 110-112 may also be configured to provide coordinated transmissions to UEs, e.g. the user equipment, UE 121, located within a specific coordinated area, e.g. cells 101-105 and cell 107. The network nodes 110-112 corresponding to this coordinated area may be referred to as a Coordinated Multi Point, CoMP, cluster. The coordinated area may comprise any number of coordinated cells or sectors of the network nodes 110-112. Coordinated transmissions may be performed by the network nodes 110-112 to increase the spectral efficiency in the radio communications network and thus increase the system throughput.

Furthermore, in some cases, such as, for example, for UEs that are on the boundaries of the coordination area, the dominant interferers may not be found within the coordinated area, i.e. in range of the coordinated transmission points or cells, but from outside the coordinated area. This Inter-Cluster Interference, ICI, which cannot be controlled from within the coordinated area, may also impact the CSI reports in an unknown way.

Furthermore, although embodiments below are described with reference to the scenario of FIG. 1, this scenario should not be construed as limiting to the embodiments herein, but merely as an example made for illustrative purposes.

As part of developing the embodiments herein, it has been noticed that the LTE standard does presently not specify to what extent a UE is allowed to perform interference filter processing of its interference measurements in time. A network node must therefore exercise care when interpreting CSI feedback information from the UE for situations where the interference changes.

For example, for an hypothesis/scenario transmitted during multiple CSI reporting periods where the CSI reports fluctuate and/or show systematic change, the network node cannot tell whether the interference processing of the UE affecting the reported transmission configuration, i.e. the reported CSI, has converged, or if the changes represent some actual physical phenomenon, such as, e.g. Inter-Cluster Interference, ICI, mobility or fast fading changes and whether or not they are accurately tracked by the UE.

Since the measured interference will vary, it is in many situations important for the network to know for how long time the transmission configuration, i.e. the CSI reported by the UE, is affected by the interference which occurred during earlier transmissions. This is especially important for coordinated transmissions, e.g. CoMP transmission, where the coordination has the potential to significantly improve the spectral efficiency if it may be done on a fast enough basis.

A known solution would be to adopt a very long safety margin on the time periods that the UE measures on for any given hypothesis or scenario. Thus, the interference processing of the UE will have time to converge for a stable interference situation. This, however, will degrade the performance for the coordinated transmissions, in particular, for large coordination clusters and advanced CoMP schemes, since the interference measurements will be inefficient and take a long time to complete; that is, it may result in an unacceptable overhead, longer time to evaluate all relevant interference hypotheses/scenarios, and/or outdated CSI information.

In accordance with embodiments described herein, this issue is addressed by estimating the convergence time of the interference processing based on CSI reports before and after switching the interference state of at least one CSI process. This enables the network node 110 to estimate when the reported CSI associated with a specific interference state is not significantly affected by interference in previous interference state measurements. By keeping track of the convergence time of UEs, the network node 110 may minimize the duration of the interference state, while still limiting the interference from leaking between different interference state measurements. Thus, a faster and more accurate prediction of the behaviour of the UE in different coordinated transmission schemes will be achieved, which in turn will improve the performance for such coordinated transmissions and result in an improved spectral efficiency in the radio communications network.

In short and with reference to FIG. 1, the network node 110 according to the embodiments herein may analyse the CSI reports received from the UE 121 and monitor how the reported CSI evolves over time after performing a switch or changes in transmission patterns on the CSI-IM(s) in the radio communications network 100. Based on this information, the network node 110 may then determine an estimate of the convergence time of the filtering processing of the UE 121.

Subsequently, the network node 110 may use the estimate of the convergence time of the filtering processing of the UE 121 when performing a configuration and/or operation of coordinated transmissions in a coordinated area to which the UE 121 is associated, e.g. the CoMP cluster in FIG. 1. Alternatively, the network node 110 may use the estimate of the convergence time of the filtering processing of the UE 121 for determining how fast the radio communications network 100 is allowed to update the transmission patterns on CSI-IM, i.e. switch interference states of the CSI processes, within a coordinated area without having components from previous interference states significantly influencing the reported CSI due to the filtering processing in the UE 121.

It should be noted that the period of time during which one hypothesis/scenario may be measured to be able to achieve convergence of the filtering processing in the UE 121 is denoted as a measurement period. An important aspect for the performance of the coordinated transmissions from the network node 110 is to be able to collect interference information quickly, i.e. having as short measurement periods as possible. The measurement period may comprise multiple CSI reporting periods, wherein a CSI reporting period is the time between the receptions of CSI reports at the network node 110.

Example of embodiments of a method performed by a network node 110 for estimating a convergence time of interference processing in a user equipment, UE 121, served by the network node 110 in a radio communications network 100, will now be described with reference to the flowchart depicted in FIG. 2. The network node 110 has at least one first CSI process configured for the UE 121.

Figure 2:
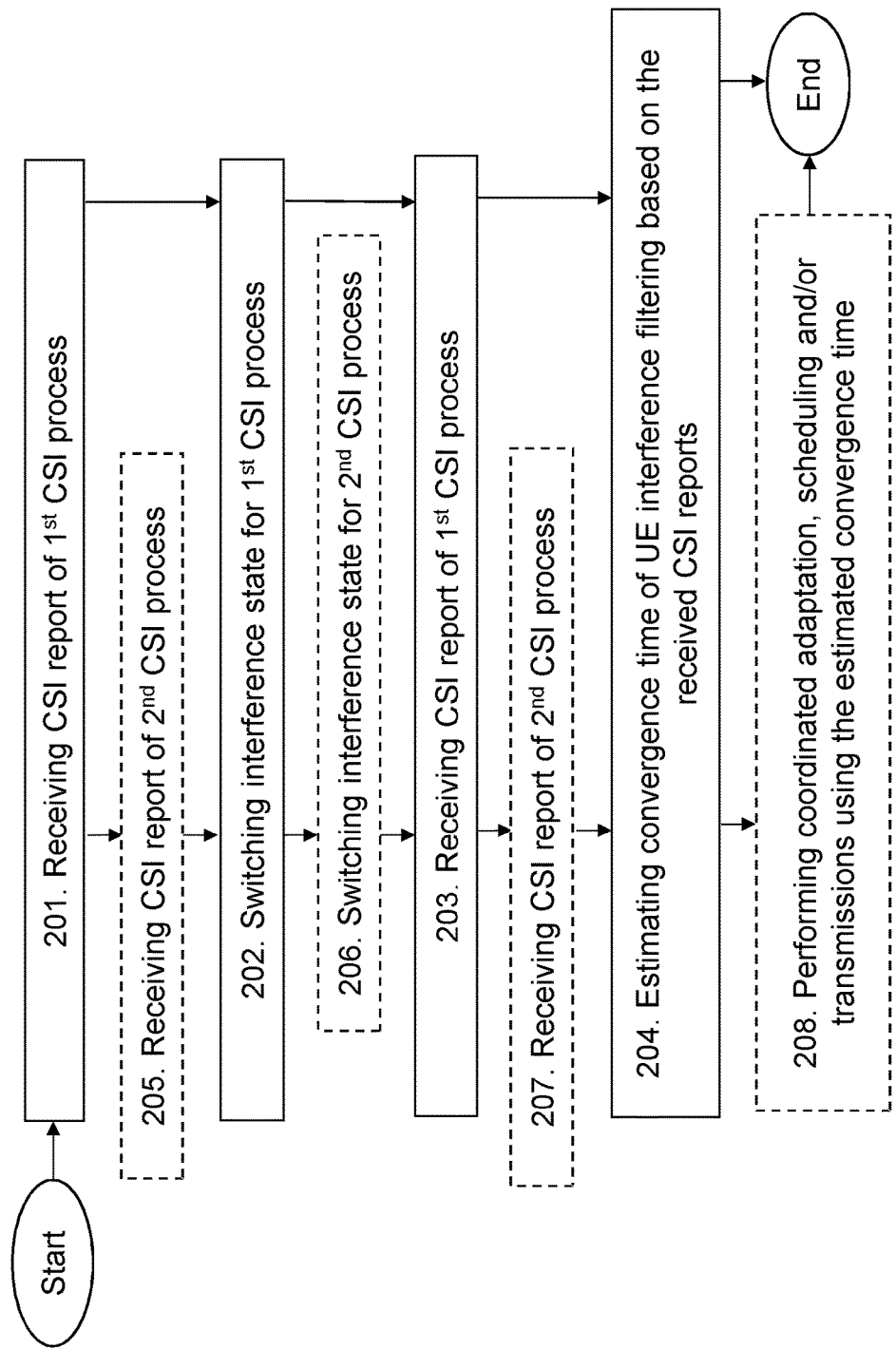
FIG. 2 is a flowchart depicting embodiments of a method in a network node.

FIG. 2 is an illustrated example of actions or operations which may be taken by any one of the network nodes 110-112. However, it should also be noted that these actions or operations may also be performed by a centralized network node in the radio communications network 100, such as, e.g. a core network node, a radio network controller, a Radio Resource Management, RRM, server, an Operations Support System, OSS, node or the like. The centralized network node may also be e.g. an eNB controlling distributed Remote Radio Units, RRUs, via e.g. a Common Public Radio Interface, CPRI, or an eNB controlling radio heads over an active Distributed Antenna System, DAS, network. The method may comprise the following actions.

Action 201

In this action, the network node 110 receives CSI reports of a first CSI process, that is, the network node 110 receives, from the UE 121, at least one first CSI report based on signals transmitted on interference measurement resources, e.g. CSI-IM, of the first CSI process of the UE 121. Here, the first CSI process is in a first interference state. The first interference state may be determined by one or more transmission points operative to cause a first transmission pattern of the signals on the interference measurement resources, e.g. CSI-IM, of the first CSI process. The transmission points may, for example, be configured in transmission settings by the network node 110.

It should be noted that the signals transmitted on interference measurement resources, e.g. CSI-IM, of the first CSI process may be broadcasted to several UEs in one or more cells 101-105, 107 by the network node 110.

Action 202

After receiving the CSI report of the first CSI process, the network node 110 switches the interference state for the first CSI process. This means that the network node 110 switches the first CSI process from the first interference state to a second interference state. The second interference state may be determined by one or more transmission points operative to cause a second transmission pattern of the signals on the interference measurement resources of the first CSI process.

Action 203

After the switch of interference state in Action 202, the network node 110 continues to receive CSI reports of the first CSI process, that is, the network node 110 receives, from the UE 121, at least one second CSI report based on signals transmitted on the interference measurement resources of the first CSI process of the UE 121. Because of the switch in Action 202, the first CSI process is here in the second interference state.

Action 204

In this action, the network node 110 estimates the convergence time of the UE interference filtering based on the received CSI reports. This means that the network node 110 estimates the convergence time of the interference processing in the UE 121 using the received at least one first CSI report and the received at least one second CSI report.

In some embodiments, when e.g. only a first CSI process is supported by the UE 121, the convergence time may be estimated by the network node 110 based on the time it takes from the switch of interference states, minus a CSI feedback delay from the UE 121, to the time a CQI comprised in the received at least one second CSI report has stabilized around a value. In this case, and according to some embodiments, the switch according to Action 202 may be performed according to a configured interference state sequence which specifies points in time when the interference state of the first CSI process is to be switched. The configured interference state sequence may also be adapted to a periodic or aperiodic reception of the at least one first CSI report and at least one second CSI report. These embodiments are described in more detail below with reference to FIG. 3.

Figure 3:
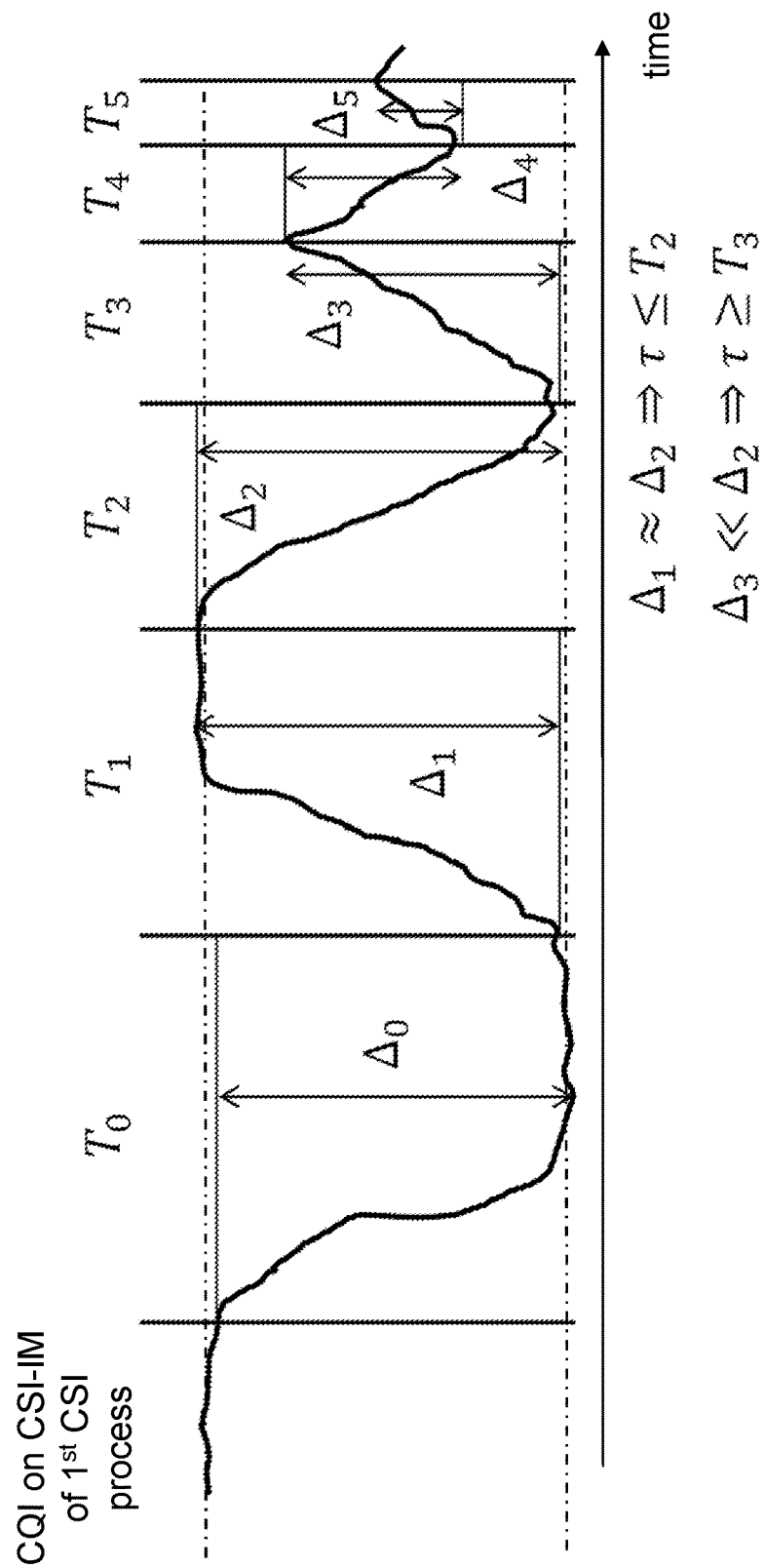
FIG. 3 is a schematic graph depicting embodiments of a network node.

FIG. 3 shows a schematic graph depicting embodiments of a network node 110 wherein the estimation of the convergence time of the UE interference filtering is based on a single CSI process, i.e. only the first CSI process. The embodiments described here correspond to Actions 201-204 and may be used for UE terminals that do not support CSI reporting of multiple CSI processes, i.e. more than one CSI process. It may here be assumed that the UE 121 is configured to report CQI in CSI reports for the first CSI process.

Up until the start of period $T_0$, the CQI received in CSI reports based on signals transmitted on CSI-IM of the first CSI process of the UE 121 is shown in the graph of FIG. 3. Here, the first CSI process is in the first interference state and the reported CQI is stable around a value (indicated in FIG. 3 by the upper dashed-dotted line).

At the start of period $T_0$, the network node 110 switches the interference state of first CSI process from the first interference state to the second interference state. One example of a switch in interference states for a reference transmission point, TP1, is shown below in Table 1:

TABLE 1

| 1st interference state | | | | 2nd interference state | | | |
|---|---|---|---|---|---|---|---|
| CSI-IM | TP1 | TP2 | TP3 | CSI-IM | TP1 | TP2 | TP3 |
| 1 | 0 | 0 | 0 | 1 | 0 | 1 | 1 |

In Table 1, a TP having value "0" means that the TP is not transmitting on the CSI-IM of the first CSI process, i.e. being turned off, and a TP having value "1" means that the TP is transmitting on the CSI-IM of the first CSI process, i.e. being turned on. Thus, according to Table 1, the two transmission points, TP2 and TP3, are switched for the first CSI process, CSI-IM 1, from a first interference state (0, 0, 0) to a second interference state (0, 1, 1).

Thus, after the start of period $T_0$, the graph of FIG. 3 shows the CQI received in CSI reports based on signals transmitted on CSI-IM of the first CSI process. Here, due to the switch, the first CSI process is in the second interference state. At the end of period $T_0$, the graph of FIG. 3 shows that the CQI received in at least one second CSI report based on signals transmitted on CSI-IM of the first CSI process has converged or stabilized around a value (indicated in FIG. 3 by the lower dashed-dotted line).

The network node 110 may then estimate the convergence time of the interference processing in the UE 121 based on the CQI of the CSI reports of the first CSI process to the time $T_0$. However, while this time $T_0$ only may provide a rough estimate of the convergence time, the network node 110 may repeat the switch of the interference state of the first CSI process continuously and subsequently shorten or increase the time period between the switches. This is shown in FIG. 3 by the time periods $T_1$, $T_2$, $T_3$, $T_4$, and $T_5$. This may, for example, be referred to as a sounding interference-state sequence, i.e. the sounding interference-state sequence specifies points in time where the interference states change. This may be implemented both for aperiodic and periodic CSI reporting.

For aperiodic reporting by the UE 121, the sounding interference-state sequence further ensures that the network node 110 sweep through a range of interval time-lengths for the first and second interference states. For example, from the minimum CQI reporting periodicity and up to a maximum configured limit. In some embodiments, the sounding interference-state sequence may be based on a chirp-sequence, where the time-length between the switching of interference states increases over time up to a configured maximum limit, or similarly, reduces from a max limit to a minimum limit.

The network node 110 may then subsequently analyse the variability, e.g. $\Delta_1$, $\Delta_2$, $\Delta_3$, $\Delta_4$, $\Delta_5$, in CQI reported in the CSI reports of the first CSI process over time. Thus, when the time-length is much shorter than the convergence time, the variability between switches should be substantially lower than in the case when the time-lengths are longer than the convergence time. The network node 110 may estimate or quantify the convergence time by identifying at which time-length the variability increases due to interference variations.

One example is shown by the mathematical expression in FIG. 3, which indicates that if the variability $\Delta_1$ during $T_1$ is about the same as the variability $\Delta_2$ during $T_2$, then the convergence time, $\tau$, may be estimated as smaller than or equal to the $T_2$. It further indicates that if the variability $\Delta_3$ during $T_3$ is much lower than the variability $\Delta_2$ during $T_2$, then the convergence time, $\tau$, may be estimated as higher than or equal to the $T_3$.

Furthermore, aperiodic CSI reporting may be configured such that the UE 121 reports CQI in the CSI reports of the first CSI process just before the switch of the interference states takes place. Alternatively, the shortest time-length that allows the reported CQI in the CSI reports of the first CSI process to stabilize after an interference state switch may be identified by the network node 110, which makes it possible for the network node 110 to obtain an upper limit to the convergence time.

For periodic CSI reporting by the UE 121, several CSI reports may be received by the network node 110 during each time interval T between switches between the first and second inference states. Thus, the convergence time may be estimated by the network node 110 as the time it takes until the CQI in the CSI reports of the first CSI process stabilize for the new interference state, whenever the time interval between interference state switches is longer than the convergence time. The transmission of a sounding interference-state sequence may be repeated in time by the network node 110 to average out noise and/or fading components in the convergence time estimation.

Action 205

In this optional action, the network node 110 may according to some embodiments receive CSI reports of a second CSI process, that is, the network node 110 may receive, from the UE 121, at least one third CSI report based on signals transmitted on interference measurement resources, e.g. CSI-IM, of a second CSI process of the UE 121. Here, the second CSI process is in a third interference state. The third interference state may be determined by one or more transmission points operative to cause a first transmission pattern of the signals on the interference measurement resources, e.g. CSI-IM, of the second CSI process.

As for the first CSI process, it may be noted that the signals transmitted on interference measurement resources, e.g. CSI-IM, of the second CSI process may also be broadcasted to several UEs configured to report CSI in the one or more cells 101-105, 107 by the network node 110.

Action 206

Alternatively, after receiving at least one CSI report of the second CSI process in Action 205, the network node 110 may, in some embodiments, switch the interference state for the second CSI process. This means that the network node 110 may switch the second CSI process from the third interference state to a fourth interference state. This is performed simultaneously with the switch from the first interference state to the second interference state for the first CSI process in Action 202.

Action 207

In this optional action, the network node 110 may continue to receive CSI reports of the second CSI process, that is, the network node 110 may receive, from the UE 121, at least one fourth CSI report based on signals transmitted on the interference measurement resources of the second CSI process of the UE 121. Here, the second CSI process is in a fourth interference state. The fourth interference state may be determined by one or more transmission points operative to cause a second transmission pattern of the signals on the interference measurement resources e.g. CSI-IM, of the second CSI process.

In this case, the estimation of the convergence time of the interference processing in the UE 121 further comprises using the received at least one third CSI report and the received at least fourth CSI report.

In some embodiments, the third and fourth interference state of the second CSI process is here the same interference state as the second interference state of the first CSI process. This is the case, for example, when a switch of interference state for the second CSI process is not made according to the optional Action 206.

In this case, and in some embodiments when at least a first and second CSI process is supported by the network node 110, the convergence time may be estimated by the network node 110 based on the time it takes from the switch of interference states, minus a CSI feedback delay from the UE 121, to the time when the CQI comprised in the received at least one second CSI report have stabilized to about the same value as the CQI comprised in the received at least one fourth CSI report. This is because the at least one second CSI report of the first CSI process will then reflect the same interference state as the at least one fourth CSI report of the second CSI process. These embodiments are described in more detail below with reference to FIG. 4.

Figure 4:
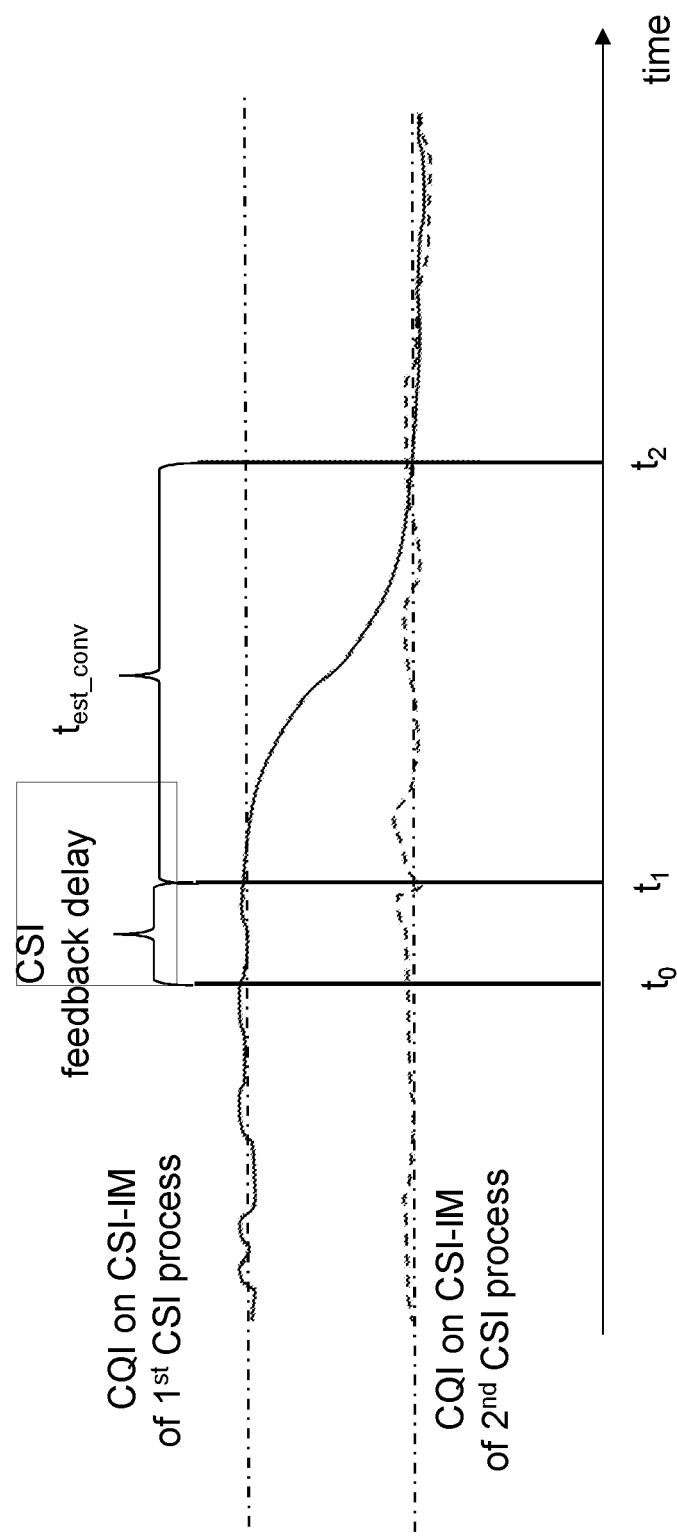
FIG. 4 is another schematic graph depicting embodiments of a network node.

FIG. 4 shows a schematic graph depicting embodiments of a network node 110 wherein the estimation of the convergence time of the UE interference filtering is based on paired CSI processes, i.e. at least a first and second CSI process is supported by the UE 121. These embodiments correspond to Actions 201-205 and 207. It may here be assumed that the UE 121 is configured to report CQI in CSI reports for both a first and a second CSI process.

Here, the network node 110 transmits two distinctly different hypotheses or scenarios on two separate CSI-IMs belonging to the first and second CSI process, respectively. The UE 121 then measures on each of the CSI-IMs and separately reports the CSI back to the network node 110. In some embodiments, an initial guard period may be used to let the filtering processing in the UE 121 stabilize to each interference state during which the network node 110 only monitors the reported CQI in the CSI reports of each of the CSI processes. This may be seen in the graph of FIG. 4 up until the time $t_0$, where the CQI received in CSI report based on signals transmitted on CSI-IM of the first CSI process and on the CSI-IM of the second CSI process is shown.

As the CQI in the CSI reports stabilize around an average value that exhibit the same phenomenological behaviour, such as, e.g. being similarly affected by changes in fast fading and/or Inter-Cluster Interference, ICI, the network node 110 performs a switch of the interference state of one of the CSI processes to the same interference state as the other one of the CSI processes at the time $t_0$. One example of switch in interference states for a reference transmission point, TP1, is shown below in Table 2:

TABLE 2

| 1$^{st}$ interference state (up to $t_0$) | | | | 2$^{nd}$ interference state (from $t_0$) | | | |
|---|---|---|---|---|---|---|---|
| CSI-IM | TP1 | TP2 | TP3 | CSI-IM | TP1 | TP2 | TP3 |
| 1 | 0 | 0 | 0 | 1 | 0 | 1 | 1 |
| 2 | 0 | 1 | 1 | 2 | 0 | 1 | 1 |

According to Table 2, the two transmission points, TP2 and TP3, are switched for the first CSI process, CSI-IM 1, from a first interference state to a second interference state. Here, TP2 and TP3 are not switched for the second CSI process, e.g. CSI-IM 2.

After the time $t_0$, both the first and second CSI processes of the UE 121 will measure on the same hypotheses or scenario, i.e. experiencing the same interference state. This means that the CQI in the CSI report from the UE 121 for the first and second CSI processes will reflect the same interference state and that fast fading and/or Inter-Cluster Interference, ICI, are now captured equally on both CQIs reported in each of the CSI reports for both the first and second CSI processes.

Since the interference filtering processing of the UE 121 will not have stabilized for the first CSI process for which the interference state was changed, the network node 110 may by determining how long it takes for the CQI in the CSI reports of the first CSI process to become matched to the CQI in the CSI reports of the second CSI process estimate how long time the UE filter processing needs to converge on that specific type of switch or change. This is shown in FIG. 4 as time $t_1$ to $t_2$, i.e. $t_{est\_conv}$.

It should also be noted that, as shown in FIG. 4 as time $t_0$ to $t_1$, the CSI feedback delay from the UE 121 to the network node 110 which is known at the network node 110 may be taken into account, i.e. deducted, by the network node 110 when estimating the convergence time.

Furthermore, it should be noted that the response to different types of hypothesis or scenario changes, i.e. interference changes, by the UE 121 may be performed, and the convergence time estimated for each of these changes. Presumably, the determined convergence behaviour will be both UE type specific and dependent on several other factors, such as, e.g. the strength difference of the hypotheses/scenario, the rank of the CSI processes, and how many interfering transmission points that are changed, etc. However, this could be built up and catalogued over time by the network node 110 and may be partially reused.

In some embodiments, one specific type of change could be to turn the strongest interfering transmission point on or off and test the convergence time behaviour of the filtering processing of the UE 121. To speed up the estimations of the convergence time, multiple UEs' registered changes could be used to more quickly cover a range of reported SINR, but most likely a cataloguing approach would give sufficient data. Even if only the convergence time behaviour on, for example, turning on or off the strongest interfering transmission points is captured, this information is useful as a rough estimate of the convergence time. Any further information may be used by the network node 110 to fine tune such an estimate.

In some embodiments, the network node 110 may switch interference states such that the difference between hypothesis/scenarios tested using the same CSI processes is minimized. In some cases, this may be performed in order to minimize the measurement time needed for convergence of the CQI of the CSI reports of the first and second CSI processes, e.g. when the filter processing of the UE 121 behaves similar to an Infinite Impulse Response (IIR) filter.

In some embodiments, the network node 110 may also adapt the measurement periods of the CSI reports based on the hypotheses/scenario changes.

An advantage with the embodiments described with reference to FIG. 4 is that the reference CSI process, i.e. the second CSI process, enables the network node 110 to cancel out variations in reported CQI in the received CSI reports that is not due to the interference filtering processing of the UE 121.

In some embodiments, the third interference state of the second CSI process is here the same interference state as the second interference state of the first CSI process, and the fourth interference state of the second CSI process is here the same interference state as the first interference state of the first CSI process. This is the case, for example, when a switch of interference state for the second CSI process is made according to the optional Action 206.

In this case, and in some embodiments when at least the first and second CSI process is supported by the network node 110, the convergence time may be estimated by the network node 110 based on at least twice the time it takes from the switch of interference states, minus a CSI feedback delay from the UE 121, to the time when the CQI comprised in the at least one second CSI report and the CQI comprised in the at least fourth CSI report reaches about the same value. This may be performed, for example, when a switch of interference state for the second CSI process is made according to the optional Action 204. This is because by simultaneously switching the first CSI process from the first to the second interference state and the second CSI process vice versa (i.e. from the third to the fourth interference state, wherein the third interference state is the same as the second interference state, and the fourth interference state is the same as the first interference state), a halfway point of the convergence time may be found where the CQI of the at least one second CSI report of the first CSI process intersect with the CQI of the at least one fourth CSI report of the second CSI process. In other words, the convergence time is estimated through determining the half time of the interference filtering processing in the UE 121.

In some cases, the convergence of the filter processing in the UE 121 may be faster in the beginning after the switch, whereby a convergence time longer than twice the halftime may be employed by the network node 110. These embodiments are described in more detail below with reference to FIG. 5.

Figure 5:
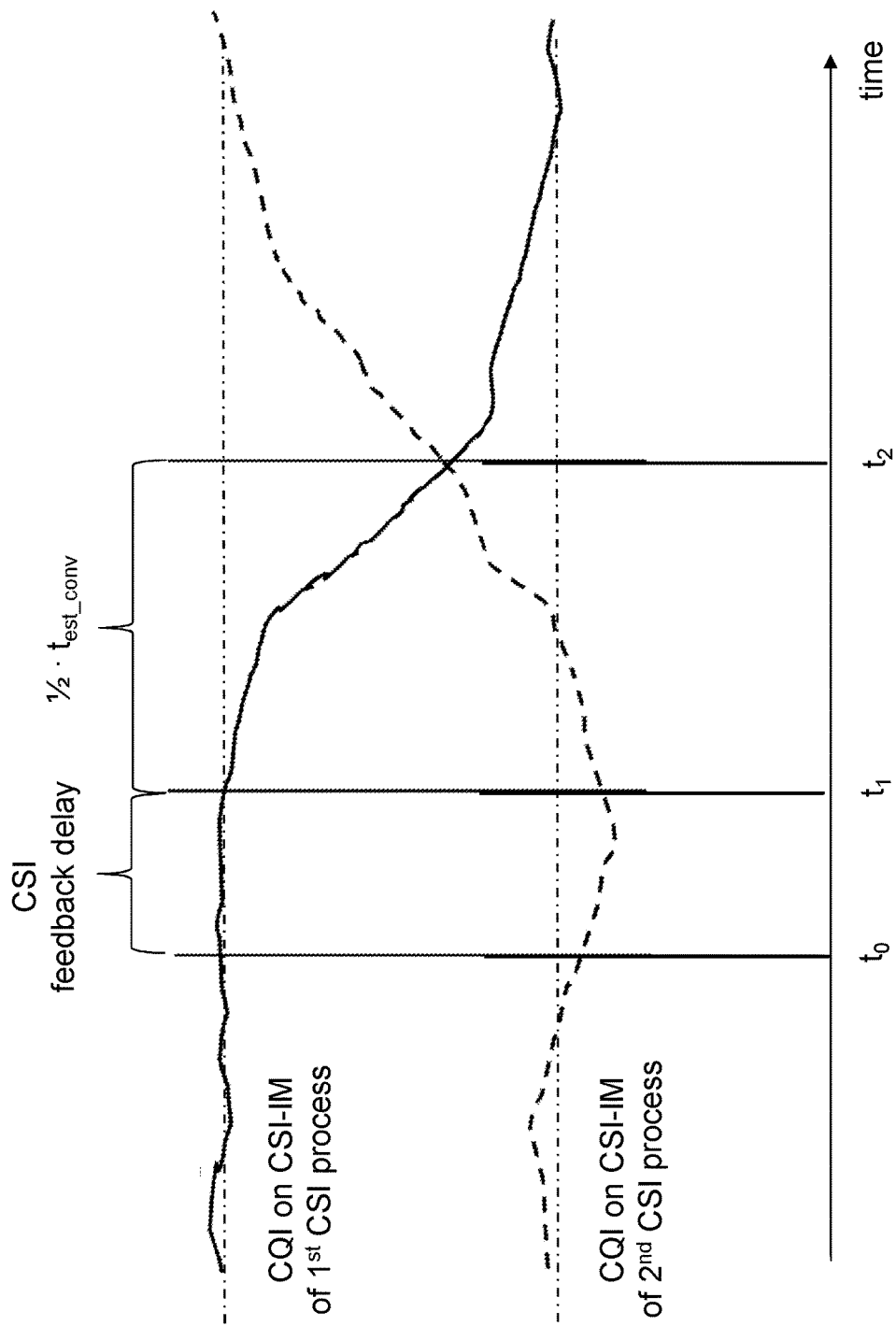
FIG. 5 is a further schematic graph depicting embodiments of a network node.

FIG. 5 shows another schematic graph depicting embodiments of a network node 110 wherein the estimation of the convergence time of the UE interference filtering is based on paired CSI processes, i.e. at least a first and second CSI process is supported by the UE 121. These embodiments correspond to Actions 201-207. It may here be assumed that the UE 121 is configured to report CQI in CSI reports for both a first and a second CSI process.

Also in this case, the network node 110 may configure or coordinate the transmission points to transmit two distinctly different hypotheses/scenarios on two separate CSI-IMs. The UE 121 then measures on each of the CSI-IMs and separately reports the CSI back to the network node 110. In some embodiments, a guard period may here be applied by the network node 110 to ensure that the filtering processing in the UE 121 has stabilized. This may be seen in the graph of FIG. 5 up until the time $t_0$, where the CQI received in CSI report based on signals transmitted on CSI-IM of the first CSI process and on the CSI-IM of the second CSI process is shown.

At the time $t_0$, the network node 110 performs a switch of the interference state of both the first and second CSI process. In these embodiments, the first CSI process is switched to the interference state of the second CSI process, while the second CSI process is switched to the interference state of the first CSI process, i.e. the transmission settings for the two CSI processes are flipped. One example of switch in interference states for a reference transmission point, TP1, is shown below in Table 3:

TABLE 3

| $1^{st}$ interference state (up to $t_0$) | | | | $2^{nd}$ interference state (from $t_0$) | | | |
|---|---|---|---|---|---|---|---|
| CSI-IM | TP1 | TP2 | TP3 | CSI-IM | TP1 | TP2 | TP3 |
| 1 | 0 | 1 | 1 | 1 | 0 | 0 | 1 |
| 2 | 0 | 0 | 1 | 2 | 0 | 1 | 1 |

According to Table 3, the two transmission points, TP2 and TP3, are switched for the first CSI process, CSI-IM 1, from a first interference state to a second interference state, and also the TP2 and TP3 are switched for the second CSI process, CSI-IM 2, from a third interference state to a fourth interference state. Here, it may be seen that the first interference state is the same as the fourth interference state, and the second interference state is the same as the third interference state.

The time interval $t_0$ to $t_1$ correspond to the CSI feedback delay from the UE 121 to the network node 110. This delay is known at the network node 110 may be taken into account, i.e. deducted, by the network node 110 when estimating the convergence time.

The network node 110 may then analyse the subsequent reported CQI in the CSI reports of the first and second CSI processes and determine when the CQIs of the first and second CSI process matches, i.e. cross each other, at time $t_2$ in order to estimate the half-time of the UE's filter processing convergence, $½·t_{est\_conv}$. The half-time of the of the UE's filter processing convergence may be defined as the time it takes for the CQI value in the CSI reports of the CSI process to make 50% of its adjustment in some scale, such as, for example, in dB or in a linear SINR equivalent scale, after the switch or change in interference state of the CSI process.

The network node 110 may then, for example, multiply this by 2 or another adjustment factor, to get an estimate of the convergence time of the filtering processing of the UE 121.

In some embodiments, this procedure may be repeated one or more times in order to provide better statistics and average out noise and/or fading effects in the reported CQI in the CSI reports of the first and second CSI process.

An advantage with the embodiments described with reference to FIG. 5 is that the CSI resources, e.g. CSI-IM, may be used more efficiently, since the CSI processes do not cover the same interference hypothesis/scenario in the convergence time determining period, such as, e.g. in the embodiments described with reference to FIG. 4. While the latter may be effective while the convergence time determination is performed on a relatively sparse basis, the efficiency of the use of the CSI-IMs may be an issue if the convergence time determination is performed relatively often.

It should also be noted that typically it is not only for the UE 121 that the network node 110 determines the convergence time of the interference filtering processing, but other UEs may also be measuring on the same CSI-IMs.

It should further be noted that according to some embodiments, the switch according to Action 202 and/or Action 206 may be performed passively by the network node 110 based on changes of the transmission of the interference measurement signals occurring due to natural changes in UE traffic and/or the load in the radio communications network 100. In other words, this means that the estimation based on a single first CSI process or paired first and second CSI processes as described above may be performed passively through natural changes in the transmission on CSI-IM resources due to traffic dynamics of the UEs and/or system load changes. This may be performed because when UEs, e.g. UE 121, enter in or exit out of the radio communications system 100, it is natural that the interference placed on the CSI-IMs, i.e. the signals transmitted on interference measurements resources of the CSI processes, change accordingly. By ensuring that these changes on the CSI-IMs are also covered by a single first CSI process or paired first and second CSI processes, it is possible to configure the UE 121 to report CSI on the single first CSI process or paired first and second CSI processes. This means that each natural switch, e.g. due to UE traffic changes and/or loads in the radio communications network 100, will provide the network node 110 with an opportunity to passively assess the conversion time of the filtering processing of the UE 121.

Furthermore, in some embodiments, the estimating of the convergence time may comprise averaging two or more estimations of the convergence time.

Also, in some embodiments, the estimating of the convergence time may further be based on, or be adapted to consider, noise and/or signal variations on the interference measurement signals, e.g. CSI-IM, caused by fading. This may make the estimation of the convergence time robust to variations that are not directly a consequence of changing interference patterns on the CSI-IMs.

Action 208

In this action, the network node 110 may perform coordinated link adaptation, scheduling and/or transmissions using the estimated convergence time, that is, the network node 110 may perform one or more of: coordinated link adaptation, coordinated scheduling, and/or coordinated transmission, based on the estimated convergence time.

Figure 6:
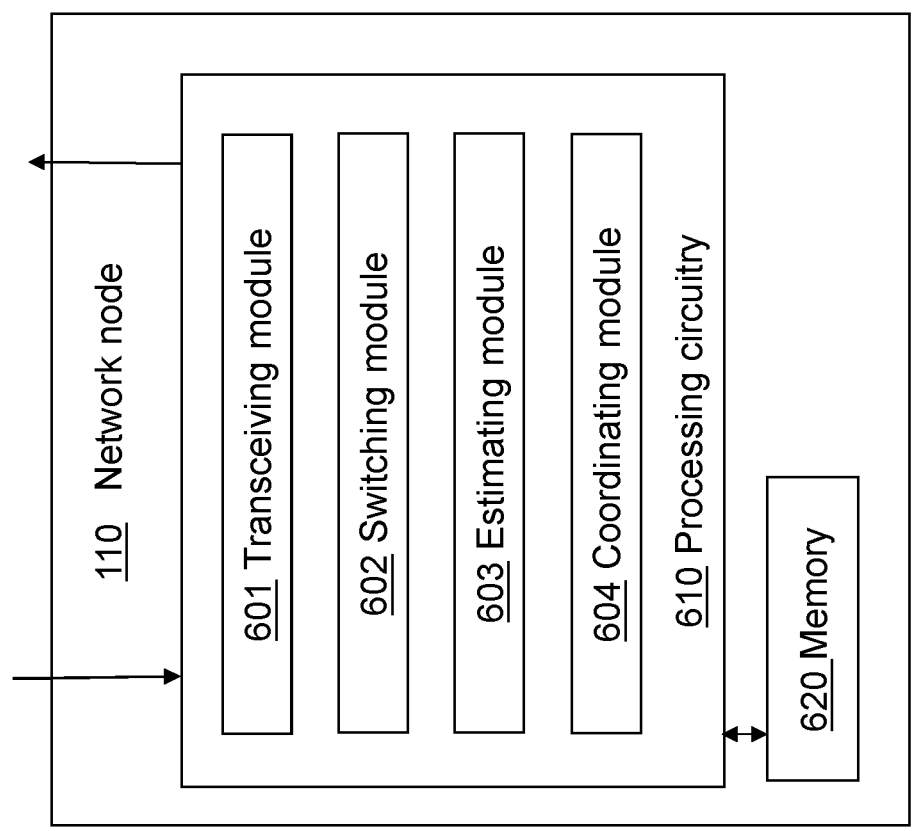
FIG. 6 is a schematic block diagram depicting embodiments of a network node.

To perform the method actions in the network node 110 for estimating a convergence time of interference processing in the UE 121 served by the network node 110 in a radio communications network 100, the network node 110 may comprise the following arrangement depicted in FIG. 6. The network node 110 is configured to be in a wireless communications network, such as, e.g. the radio communications network 100 in FIG. 1.

FIG. 6 shows a schematic block diagram of embodiments of the network node 110. In some embodiments, the network node 110 may comprise a transceiving module 601, a switching module 602, an estimating module 603 and a coordinating module 604. In some embodiments, the network node 110 may comprise a processing circuitry 610, which may also be referred to as processing module, processing unit or processor. The processing circuitry 610 may comprise one or more of the transceiving module 601, switching module 602, estimating module 603 and a coordinating module 604, and/or perform the function thereof described below.

The network node 110 is configured to, or comprises the transceiving module 601 being configured to, receive, from the UE 121, at least one first CSI report based on signals transmitted on interference measurement resources of a first CSI process of the UE 121, wherein the first CSI process is in a first interference state.

Also, the network node 110 is configured to, or comprises the switching module 602 being configured to, switch the first CSI process from the first interference state to a second interference state. Furthermore, the network node 110 is configured to, or comprises the transceiving module 601 being configured to, receive, from the UE 121, at least one second CSI report based on signals transmitted on the interference measurement resources of the first CSI process of the UE 121, wherein the first CSI process is in the second interference state. The network node 110 is also configured to, or comprises the estimating module 603 being configured to, estimate the convergence time of the interference processing in the UE 121 using the received at least one first CSI report and the received at least one second CSI report.

The first interference state may be determined by one or more transmission points operative to cause a first transmission pattern of the signals on the interference measurement resources of the first CSI process, while the second interference state may be determined by one or more transmission points operative to cause a second transmission pattern of the signals on the interference measurement resources of the first CSI process. The transmission points may, for example, be configured in transmission settings by the network node 110.

In some embodiments, the network node 110 or switching module 602 may be further configured to perform the switch according to a configured interference state sequence which specifies points in time when the interference state of the first CSI process is to be switched. Here, the configured interference state sequence may be adapted to a periodic or aperiodic reception of the at least one first CSI report and at least one second CSI report. Furthermore, the network node 110 or estimation module 603 may be further configured to perform the estimation based on the time it takes from the switch of interference states, minus a CSI feedback delay from the UE 121 to the network node 110, to the time a CQI comprised in the received at least one second CSI report has stabilized around a value.

In some embodiments, the network node 110 or the transceiving module 601 may be configured to receive, from the UE 121, at least one third CSI report based on signals transmitted on interference measurement resources of a second CSI process, wherein the second CSI process is in a third interference state, and receive, from the UE 121, at least one fourth CSI report based on signals transmitted on the interference measurement resources of the second CSI process of the UE 121, wherein the second CSI process is in a fourth interference state. In this case, the network node 110 or the estimating module 601 may also be configured to estimate the convergence time of the interference processing in the UE 121 by using the received at least one third CSI report and the received at least fourth CSI report.

The third interference state is determined by one or more transmission points operative to cause a third transmission pattern of the signals on the interference measurement resources of the second CSI process, while the fourth interference state is determined by one or more transmission points operative to cause a fourth transmission pattern of the signals on the interference measurement resources of the second CSI process. The transmission points may, for example, be configured in transmission settings by the network node 110.

In some embodiments, the third and fourth interference state of the second CSI process is the same interference state as the second interference state of the first CSI process. In this case, the network node 110 or the estimating module 601 may also be configured to perform the estimation based on the time it takes from the switch of interference states minus a CSI feedback delay from the UE 121 to the time when the CQI comprised in the received at least one second CSI report have stabilized to about the same value as the CQI comprised in the received at least one fourth CSI report.

In some embodiments, the third interference state of the second CSI process is the same interference state as the second interference state of the first CSI process, and the fourth interference state of the second CSI process is the same interference state as the first interference state of the first CSI process. In this case, the network node 110 or switching module 602 may be further configured to switch the second CSI process from the third interference state to the fourth interference state simultaneously with the switch of the first CSI process from the first interference state to the second interference state.

Furthermore, in this case, the network node 110 or the estimating module 601 may also be configured to perform the estimation based on at least twice the time it takes from the switch of interference states minus a CSI feedback delay from the UE 121 to the time when the CQI comprised in the at least one second CSI report and the CQI comprised in the at least fourth CSI report reaches about the same value.

In some embodiments, the network node 110 or switching module 602 may be further configured to perform the switching of interference states passively based on changes of the transmission of the interference measurement signals occurring due to natural changes in UE traffic and/or load in the radio communications network 100.

In some embodiments, the network node 110 or the estimating module 601 may further configured to perform the estimation by averaging two or more estimations of the convergence time of the interference processing of the UE 121. Furthermore, the network node 110 or the estimating module 601 may also be configured to perform the estimation further based on noise and/or signal variations on the interference measurement signals caused by fading.

In some embodiments, the network node 110 or coordinating module 604 may further be configured to perform one or more of coordinated link adaptation, coordinated scheduling, and/or coordinated transmission, based on the estimated convergence time estimation.

The embodiments for estimating a convergence time of interference processing in the UE 121 may be implemented through one or more processors, such as, e.g. the processing circuitry 610 in the network node 110 depicted in FIG. 6, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 610 in the network node 110. The computer program code may e.g. be provided as pure program code in the network node 110 or on a server and downloaded to the network node 110. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

Thus, the network node 110 may further comprise a memory 620, which may be referred to or comprise one or more memory modules or units. The memory 620 may be arranged to be used to store executable instructions and data, such as, e.g. estimated convergence times of the interference processing of UEs, to perform the methods described herein when being executed in the network node 110, the processing circuitry 610 and/or modules 601-604. Those skilled in the art will also appreciate that the processing circuitry 610 and the memory 620 described above may refer to a combination of analog and digital circuits, and/or one or more processors configured with software and/or firmware, e.g. stored in the memory 620, that when executed by the one or more processors, such as, the processing circuitry 610 and/or modules 601-604, cause the one or more processors to perform the method as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program, comprising instructions which, when executed on at least one processor, e.g. the processing circuitry 610 or modules 601-604, cause the at least one processor to carry out the method for estimating a convergence time of interference processing in the UE 121. Also, some embodiments may further comprise a carrier containing said computer program, wherein the carrier is one of an electronic signal, optical signal, radio signal, or computer readable storage medium.

The terminology used in the detailed description of the particular exemplary embodiments illustrated in the accompanying drawings is not intended to be limiting of the described the method and the network node 110, which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method performed by a network node for estimating a convergence time of interference processing in a user equipment (UE) served by the network node in a radio communications network, the network node having at least one Channel State Information (CSI) process configured for the UE, the method comprising:
    receiving, from the UE, at least one first CSI report based on signals transmitted on interference measurement resources of a first CSI process of the UE, wherein the first CSI process is in a first interference state;
    switching the first CSI process from the first interference state to a second interference state, wherein the switching is performed according to a configured interference state sequence which specifies points in time when an interference state of the first CSI process is to be switched;
    receiving, from the UE, at least one second CSI report based on the signals transmitted on the interference measurement resources of the first CSI process of the UE, wherein the first CSI process is in the second interference state; and
    estimating the convergence time of the interference processing in the UE using the received at least one first CSI report and the received at least one second CSI report, wherein the estimating the convergence time is based on a time taken from the switching of interference states of the first CSI process minus a CSI feedback delay from the UE, to a time a Channel Quality Indicator (CQI) comprised in the received at least one second CSI report has stabilized around a value.

2. The method of claim 1, wherein the first interference state is determined by one or more transmission points operative to cause a first transmission pattern of the signals transmitted on the interference measurement resources of the first CSI process, and the second interference state is determined by one or more transmission points operative to cause a second transmission pattern of the signals transmitted on the interference measurement resources of the first CSI process.

3. The method of claim 1, wherein the configured interference state sequence is adapted to a periodic or aperiodic reception of the at least one first CSI report and the at least one second CSI report.

4. The method of claim 1, further comprising:
    receiving, from the UE, at least one third CSI report based on signals transmitted on interference measurement resources of a second CSI process of the UE, wherein the second CSI process is in a third interference state; and
    receiving, from the UE, at least one fourth CSI report based on the signals transmitted on the interference measurement resources of the second CSI process of the UE, wherein the second CSI process is in a fourth interference state, and wherein the estimating the convergence time of the interference processing in the UE further comprises using the received at least one third CSI report and the received at least one fourth CSI report.

5. The method of claim 4, wherein the third interference state is determined by one or more transmission points operative to cause a third transmission pattern of the signals transmitted on the interference measurement resources of the second CSI process, and the fourth interference state is determined by one or more transmission points operative to cause a fourth transmission pattern of the signals transmitted on the interference measurement resources of the second CSI process.

6. The method of claim 4, wherein each of the third and fourth interference states of the second CSI process is the same interference state as the second interference state of the first CSI process.

7. The method of claim 6, wherein the estimating the convergence time is further based on a time taken from the switching of interference states of the second CSI process minus a CSI feedback delay from the UE, to the time when the CQI comprised in the received at least one second CSI report has stabilized around the same value as the CQI comprised in the received at least one fourth CSI report.

8. The method of claim 4, wherein the third interference state of the second CSI process is the same interference state as the second interference state of the first CSI process, and the fourth interference state of the second CSI process is the same interference state as the first interference state of the first CSI process, and wherein the method further comprises:
    switching the second CSI process from the third interference state to the fourth interference state simultaneously with the switching of the first CSI process from the first interference state to the second interference state.

9. The method of claim 8, wherein the estimating the convergence time is futher based on at least twice the time taken from the switching of interference states of the second CSI process minus a CSI feedback delay from the UE, to the time when the CQI comprised in the received at least one second CSI report and the CQI comprised in the received at least one fourth CSI report reaches around the same value.

10. The method of claim 1, wherein the switching is performed passively based on changes in the transmission of the signals on the interference measurement resources of the first CSI process occurring due to natural changes in UE traffic and/or load in the radio communications network.

11. The method of claim 1, wherein the estimating the convergence time further comprises averaging two or more estimations of the convergence time of the interference processing in the UE.

12. The method of claim 1, wherein the estimating the convergence time is further based on noise and/or signal variations in the signals transmitted on the interference measurement resources of the first CSI process caused by fading.

13. The method of claim 1, further comprising:
    performing one or more of coordinated link adaptation, coordinated scheduling, and/or coordinated transmission, based on the estimated convergence time.

14. A network node for estimating a convergence time of interference processing in a user equipment (UE) served by the network node in a radio communications network, the network node having at least one Channel State Information (CSI) process configured for the UE, the network node comprising processing circuitry and memory, wherein the processing circuitry and the memory are configured to:

receive, from the UE, at least one first CSI report based on signals transmitted on interference measurement resources of a first CSI process of the UE, wherein the first CSI process is in a first interference state, switch the first CSI process from the first interference state to a second interference state, wherein the switching is performed according to a configured interference state sequence which specifies points in time when an interference state of the first CSI process is to be switched, receive, from the UE, at least one second CSI report based on the signals transmitted on the interference measurement resources of the first CSI process of the UE, wherein the first CSI process is in the second interference state, and estimate the convergence time of the interference processing in the UE using the received at least one first CSI report and the received at least one second CSI report, wherein the estimation of the convergence time is performed based on a time taken from the switching of interference states of the first CSI process minus a CSI feedback delay from the UE, to a time a Channel Quality Indicator (CQI) comprised in the received at least one second CSI report has stabilized around a value.

15. The network node of claim 14, wherein the first interference state is determined by one or more transmission points operative to cause a first transmission pattern of the signals transmitted on the interference measurement resources of the first CSI process, and the second interference state is determined by one or more transmission points operative to cause a second transmission pattern of the signals transmitted on the interference measurement resources of the first CSI process.

16. The network node of claim 14, wherein the configured interference state sequence is adapted to a periodic or aperiodic reception of the at least one first CSI report and the at least one second CSI report.

17. The network node of claim 14, wherein the processing circuitry and the memory are further configured to:
receive, from the UE, at least one third CSI report based on signals transmitted on interference measurement resources of a second CSI process of the UE, wherein the second CSI process is in a third interference state, and receive, from the UE, at least one fourth CSI report based on the signals transmitted on the interference measurement resources of the second CSI process of the UE, wherein the second CSI process is in a fourth interference state, and wherein to estimate the convergence time of the interference processing in the UE, the processing circuitry and the memory are further configured to use the received at least one third CSI report and the received at least one fourth CSI report.

18. The network node of claim 17, wherein the third interference state is determined by one or more transmission points operative to cause a third transmission pattern of the signals transmitted on the interference measurement resources of the second CSI process, and the fourth interference state is determined by one or more transmission points operative to cause a fourth transmission pattern of the signals transmitted on the interference measurement resources of the second CSI process.

19. The network node of claim 17, wherein each of the third and fourth interference states of the second CSI process is the same interference state as the second interference state of the first CSI process.

20. The network node of claim 19, wherein the processing circuitry and the memory are further configured to perform the estimation of the convergence time based on a time taken from the switching of interference states of the first CSI process minus a CSI feedback delay from the UE, to the time when the CQI comprised in the received at least one second CSI report has stabilized around the same value as the CQI comprised in the received at least one fourth CSI report.

21. The network node of claim 17, wherein the third interference state of the second CSI process is the same interference state as the second interference state of the first CSI process, and the fourth interference state of the second CSI process is the same interference state as the first interference state of the first CSI process, and wherein the processing circuitry and the memory are further configured to switch the second CSI process from the third interference state to the fourth interference state simultaneously with the switching of the first CSI process from the first interference state to the second interference state.

22. The network node of claim 21, wherein the processing circuitry and the memory are further configured to perform the estimation of the convergence time based on at least twice a time taken from the switching of interference states of the second CSI process minus a CSI feedback delay from the UE, to the time when the CQI comprised in the received at least one second CSI report and the CQI comprised in the received at least one fourth CSI report reaches around the same value.

23. The network node of claim 14, wherein the processing circuitry and the memory are further configured to perform the switching of interference states of the first CSI process passively based on changes in the transmission of the signals on the interference measurement resources of the first CSI process occurring due to natural changes in UE traffic and/or load in the radio communications network.

24. The network node of claim 14, wherein the processing circuitry and the memory are further configured to perform the estimation of the convergence time by averaging two or more estimations of the convergence time of the interference processing in the UE.

25. The network node of claim 14, wherein the processing circuitry and the memory are further configured to perform the estimation of the convergence time further based on noise and/or signal variations in the signals transmitted on the interference measurement resources of the first CSI process caused by fading.

26. The network node of claim 14, wherein the processing circuitry and the memory are further configured to perform one or more of coordinated link adaptation, coordinated scheduling, and/or coordinated transmission, based on the estimated convergence time.

27. A non-transitory computer-readable medium comprising, stored thereupon, a computer program comprising instructions that, when executed on at least one processor of a network node having at least one Channel State Information (CSI) process configured for a user equipment (UE) served by the network node in a radio communications network, cause the at least one processor to estimate a convergence time of interference processing in the UE by:
receiving, from the UE, at least one first CSI report based on signals transmitted on interference measurement resources of a first CSI process of the UE, wherein the first CSI process is in a first interference state;
switching the first CSI process from the first interference state to a second interference state, wherein the switching is performed according to a configured interference state sequence which specifies points in time when an interference state of the first CSI process is to be switched;

receiving, from the UE, at least one second CSI report based on the signals transmitted on the interference measurement resources of the first CSI process of the UE, wherein the first CSI process is in the second interference state; and estimating the convergence time of the interference processing in the UE using the received at least one first CSI report and the received at least one second CSI report, wherein the estimating the convergence time is based on a time taken from the switching of interference states of the first CSI process minus a CSI feedback delay from the UE, to a time a Channel Quality Indicator (CQI) comprised in the received at least one second CSI report has stabilized around a value.

\* \* \* \* \*